July 15, 1958 E. H. GATZERT 2,843,672

AUTOMATIC TELEPHONE SYSTEM

Filed Nov. 4. 1955 8 Sheets-Sheet 1

INVENTOR.
ERNEST H. GATZERT
BY Johnson [signature]
ATTORNEY

July 15, 1958 E. H. GATZERT 2,843,672

AUTOMATIC TELEPHONE SYSTEM

Filed Nov. 4, 1955 8 Sheets-Sheet 2

July 15, 1958 E. H. GATZERT 2,843,672

AUTOMATIC TELEPHONE SYSTEM

Filed Nov. 4, 1955 8 Sheets-Sheet 3

July 15, 1958 E. H. GATZERT 2,843,672

AUTOMATIC TELEPHONE SYSTEM

Filed Nov. 4. 1955 8 Sheets-Sheet 4

July 15, 1958 E. H. GATZERT 2,843,672

AUTOMATIC TELEPHONE SYSTEM

Filed Nov. 4. 1955 8 Sheets-Sheet 5

July 15, 1958 E. H. GATZERT 2,843,672

AUTOMATIC TELEPHONE SYSTEM

Filed Nov. 4, 1955 8 Sheets-Sheet 8

United States Patent Office
2,843,672
Patented July 15, 1958

2,843,672

AUTOMATIC TELEPHONE SYSTEM

Ernest H. Gatzert, Rochester, N. Y., assignor to General Dynamics Corporation, a corporation of Delaware Application November 4, 1955, Serial No. 545,070

18 Claims. (Cl. 179—6.31)

This invention relates to automatic telephone systems, and more particularly to circuits useful in such systems.

In the art of automatic telephony, it is old to use digit pulses to control switching equipment. It is necessary to provide means for determining when the end of a digit pulse train has arrived; otherwise, it would be possible for equipment to respond to one train of digit pulses, to wait and then respond again in the same fashion to another train of digit pulses. Obviously this would not be satisfactory.

Usually a slow release relay is provided to prevent this confusion. This relay operates when a circuit is seized. Then, when a digit pulse train is received, the holding circuit for the relay is switched to the control of pulsing contacts which are following and repeating the digit pulses. During this period, the relay normally depends upon its slow-release characteristics to hold it operated. Following the termination of the last pulse in the train and after the expiration of the slow release time interval, the relay releases. The relay is provided with suitable contacts for switching the pulsing circuit from its connection with the equipment that was just used so that it may not thereafter respond to a later digit during the same call.

Obviously, it is desirable to eliminate relays wherever possible. Therefore, it would be an advance in the art if some other relay could be reused to provide the switching function without requiring a new relay.

Relays which may be used for marking the end of a digit pulse train are found in all types of telephone circuits. For example, one relay of this type may be found in trunk circuits which are used to extend calls from one office to another. These calls may be directed either to subscribers or to operators in the distant office. It is necessary to provide different circuit features depending upon which of these two courses the call might take. In the first case of calls to subscribers, it may be necessary to provide conversation timing (including suitable warning tones) and reverse battery supervision. The reverse battery supervision may be used to control the collection of coins in the event that the calling subscriber is located at a paystation; or, to control the registration of a call in the event that the calling subscriber is at a station which is provided with service on a metered basis. There is no need for coin box tone during a call to a subscriber. On the other hand, the call may be directed to an operator position. Usually, these calls are completed on a free basis since normally the subscriber will not pay for information or other service calls; or, if it is a toll call, special charges must be computed and collected under supervision of the operator. Under these conditions, it is necessary to transmit a coin box tone to the operator to inform her of the fact that she should collect or refund coins at a proper time. On the other hand, it is advisable not to provide reverse battery answer supervision on this type of call, since that would collect the coin or actuate the meter at the called subscriber station.

Furthermore, it is desirable to eliminate conversation timing, if provided, since the operator is manually supervising the call and there is no need to disconnect the conversation connection.

Just as in the case of the relay used to mark the end of a digit pulse train, it is possible to eliminate other miscellaneous relays and parts in the trunk circuit. For example, in the past it has been necessary to provide separate special equipment to control conversation timing, the application of warning tone, and the like. If these features could be provided merely by reusing other equipment which is already present in the trunk circuit, there would be considerable savings.

A first object of the invention is to provide a new and improved trunk circuit.

Another object of the invention is to provide new and improved means for detecting calls destined for an operator's position as distinguished from calls destined for subscriber stations.

A further object of the invention is to provide means for extending coin box tone on calls to an operator position, and to provide conversation timing and reverse battery answer supervision on calls to subscriber stations.

A still further object of the invention is to provide a novel control circuit for operating a minor switch with a minimum number of relays.

Yet, another object of the invention is to provide a trunk circuit utilizing a minimum number of relays and parts to detect toll calls, to control a minor switch, and to provide conversation timing, warning tone, and the like.

Briefly, these and other objects are accomplished by means of a trunk circuit including digit registering means, such as a minor switch. The trunk circuit also includes a two-step supervision relay which operates to one of its steps to provide a pulse delay feature for switching the pulsing circuit at the end of the first digit pulse train to be transmitted through the trunk circuit. This same relay may be operated at another time during the call to the other of its steps to respond to supervisory signals transmitted from a called or tandem office to an originating office. The supervision relay is operated to one step when the call is originated. Following this, the calling subscriber dials a suitable number of digit pulse trains which are transmitted through the trunk circuit to set equipment in a distant office to extend the call further. The operation relay remains operated to one of its steps throughout the transmission of the first digit pulse train. A circuit is completed on this step to operate the minor switch step-by-step in synchronism with that first digit pulse train. At the end of that pulse train, the supervision relay restores to normal, thereby opening the stepping path to the minor switch. In this manner, the minor switch may not be influenced by any digit later than the first.

The position to which the minor switch is stepped determines the destination of the call. It may be either to an operator or a subscriber. If it is to an operator, there is toll marking on the step occupied by the minor switch. This toll marking effects operation of a toll relay which, in turn, eliminates both reverse battery answer supervision and conversation timing, while enabling a relay which controls the transmission of coin box tone. On the other hand, if the call is destined for a subscriber, the minor switch occupies a terminal on which there is no toll marking. In this case, the toll relay does not operate, the coin box tone is not sent, conversation timing is made possible, and reverse battery answer supervision is provided. The minor switch then drops back to normal.

Later, during the call, the minor switch is reoperated step-by-step under the influence of cyclically recurring timed pulses which are produced by common interrupter equipment. The switch takes one step every measured time period. When a conversation timing marking is encountered by the minor switch, a two-step relay is operated to one of its steps. At this time a circuit is completed for transmitting warning tone to the subscribers. This tone informs them of the fact that their call is about to be terminated. The relay then returns to normal. Later, another timed pulse causes that same two-step relay to be operated to another of its steps, thereby disconnecting the call.

It is thought that the invention will be understood best by making reference to the attached drawings in which:

Fig. 1 shows by block diagram a telephone system adapted to utilize the invention;

Figs. 2–8, when properly joined, show details of the trunk circuit and minor switch shown in Fig. 1 by heavily inked rectangles 16 and 17; and, Fig. 9 shows the manner in which Figs. 2–8 should be joined to provide a complete and understandable circuit.

The drawings are designed to provide a complete understanding of the invention. For example, the elements in Fig. 1, which include the invention, are shown by heavily inked rectangles. Also, simple plus (+) and minus (−) signs are shown to indicate the office potential. As is the case in most telephone systems, ground is described as being connected with the positive or plus (+) terminal. For this reason, the office supply has been described as "(−) battery" and "ground (+)." It should be understood that either this or any other suitable power supply may be used.

BRIEF DESCRIPTION

The invention may be described briefly by making reference to Fig. 1. A community dial office 10 is provided at some remote location with respect to an operator position. If a call is to be placed which will require the services of an operator, it is necessary to call a distant exchange, such as tandem office 20 or distant office 30, for example.

Turning first to the community dial office 10, local subscriber 11 may call tandem office 20. To do so, he may use either of two points of access depending upon the numerical value of the called number that he dials. This choice is made for him by any suitable means, such as local switching equipment 12, for example. If the call is completed through the rectangle marked "13," it is because the local subscriber has dialed zero (0) as the first digit. The zero hole on a standard telephone dial also includes the word "operator." Therefore, it is an indication that the call is being extended to an operator's position. Equipment in trunk circuit 17 operates minor switch 16 to count the number of digit pulses in the first digit pulse train. Therefore, minor switch 16 is stepped to the tenth terminal, which is marked in bank **16*a* by a suitable toll marking. This marking adapts two-way trunk circuit 17** to provide coin box tone, and to eliminate reverse battery answer supervision and conversation timing.

On the other hand, if local subscriber 11 dials any other suitable digit from 1 to 9, local switching equipment 12 operates to seize point of access 14. In this case, minor switch 16 may or may not be stepped to a position which is marked to indicate a toll call, as required. By way of example, the drawing shows a toll marking as being connected with the first terminal in bank **16*a*. Obviously this marking could be connected to any other suitable terminal. If this marking is encountered at the end of the first digit pulse, two-way trunk circuit 17 is adapted in the same manner that it was adapted when seized over the zero point of access. On the other hand, if minor switch 16 is not standing on a terminal marked in bank 16*a* by a toll marking conductor, two-way trunk circuit 17** remains in a normal condition at which time it functions to eliminate coin box tone and to provide conversation timing and reverse battery answer supervision.

The details of the minor switch and the adapting means are shown in the remaining figures. For example, bank **16*a* is shown near the lower righthand corner of Fig. 5. If a toll marking is encountered, a circuit is completed from (−) battery, through the winding of toll relay 300 (Fig. 3), a strapping on bank 16*a*, contacts 452, 255, 301*a*, 311 and 234 to ground (+). Toll relay 300 operates its contacts 301, 302, 306 and 307 to eliminate reverse battery answer supervision which otherwise would be transmitted when relay 240 operates. Contacts 302*a* operate to enable coin tone relay 230, the circuit being from ground (+), through contacts 302*a*, 243*a*, 314, 269 and the winding of relay 230 to (−) battery. Contacts 601 open to eliminate conversation timing. Obviously if no strapping is encountered on bank 16*a*, toll relay 300 does not operate. This reverses the process. Since contacts 301 and 307 remain closed, answer supervision is given when relay 240 operates. Contacts 302*a* do not close so that coin tone relay 230 cannot function to transmit coin box tone. Contacts 601** remain closed so that conversation timing is possible.

Conversation timing is under the control of cyclically recurring timed pulses which are transmitted from common interrupter equipment through contacts 651. They close responsive to called party answer supervision. The first pulse is effective for operating relay 790. Contacts 793 close each time that a timed pulse appears on timing pulse #1 conductor. A circuit is then completed from ground (+), through contacts 793, 601, 656, and the winding of minor switch stepping magnet MS. When bank **16*c* of the minor switch is properly marked, a circuit is eventually completed through the upper winding of two-step relay 810. This relay operates only to its first step, thus completing a circuit for warning tone which extends through contacts 812, 811, conductor R3 and repeat coil RC51. A circuit is also completed at a slightly later time from timing pulse #2 conductor, through contacts 643, bank 16*b* of the minor switch, and contacts 814 to the lower winding of relay 810 and (−) battery. When energized through this winding, two step relay 810 functions to disconnect the call by removing master ground at contacts 511. At that time it opens the warning tone circuit at its contacts 812**.

Trunk circuit 17 (Fig. 1) is also designed to provide for certain other calls. These calls are not described in detail hereinafter since the invention is already fully understood from the first call to be described. Briefly, however, if the call is extended through point of access 13, two-way trunk circuit 17 is designed to transmit a single impulse which it generates, thereby simulating an additional digit which is the numeral "1." This impulse is used to step selector 24 to its first level, following which it is driven automatically to seize trunk circuit 31 in distant office 30. In this manner, the subscriber in community dial office 10 may complete a tandem call without dialing an extra digit.

Another type of call is one which is incoming to community dial office 10 from tandem office 20. This call includes two-way trunk circuit 17, point of access **17*c* (which is also shown near the upper lefthand corner of Fig. 6), incoming selector 15, local switch train 12 and local subscriber 11. This call may have been originated either by a local subscriber or operator 23**, as the case may be.

DETAILED DESCRIPTION

Figure 2:
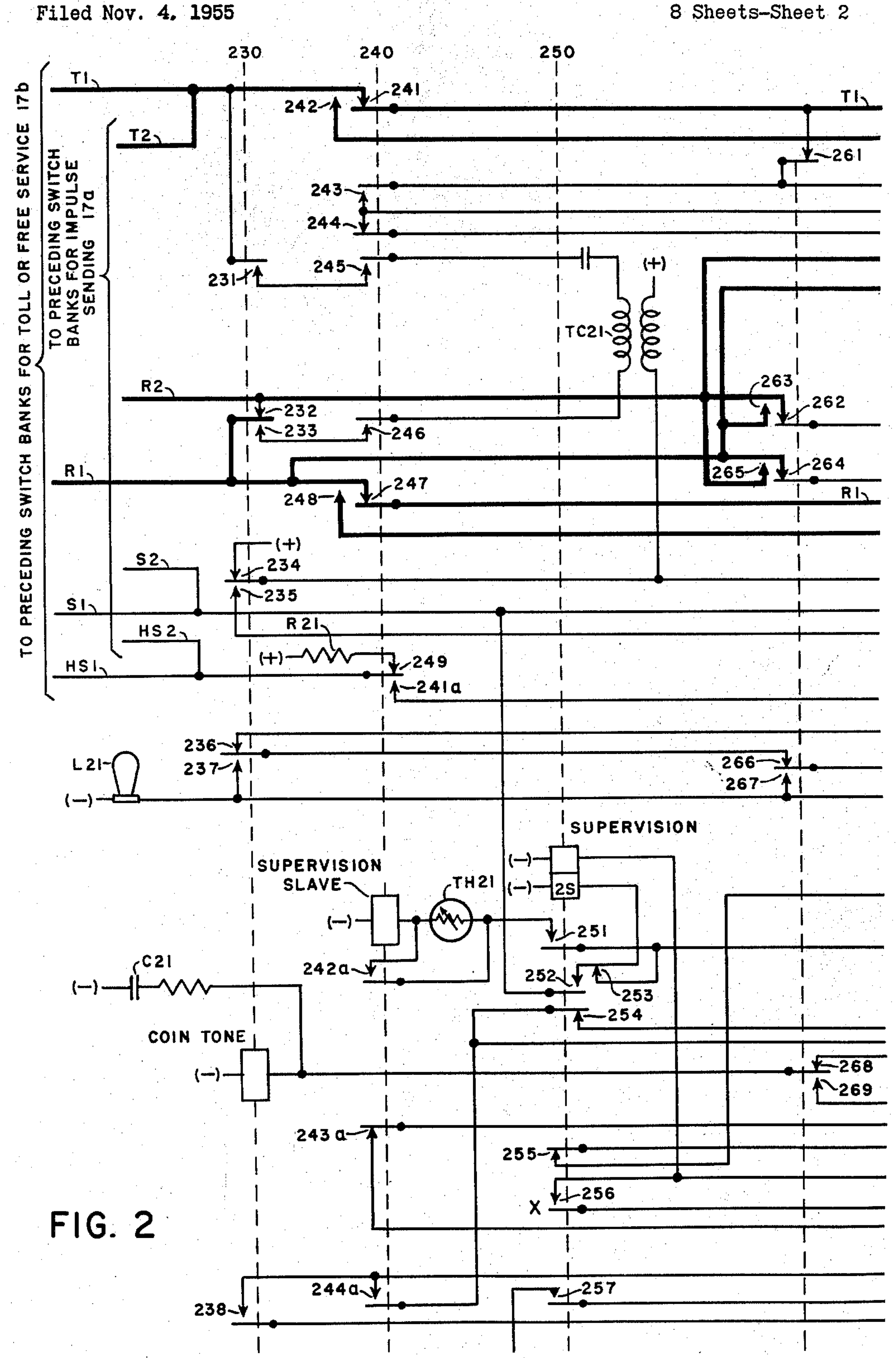
Figure 3:
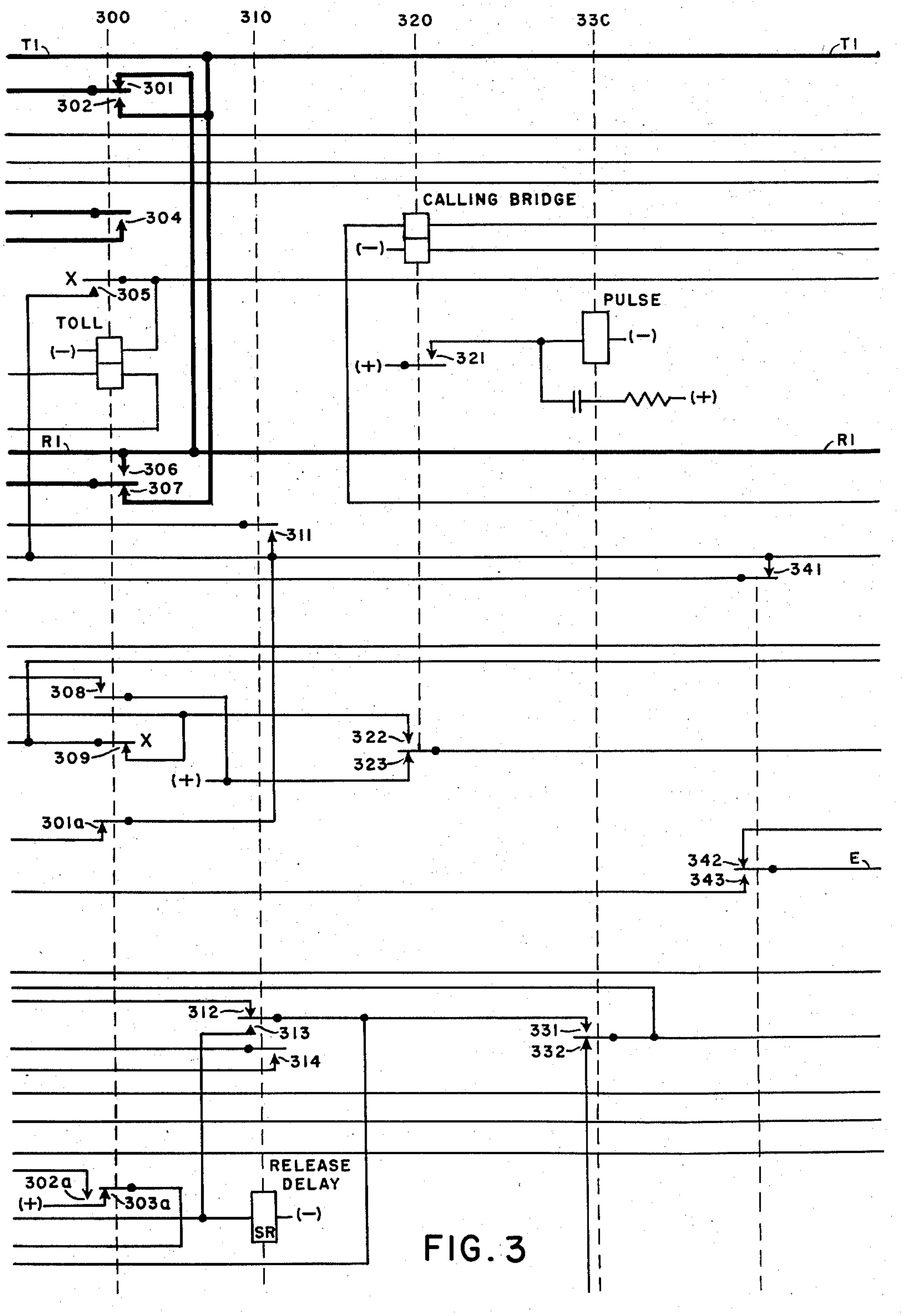
Figure 4:
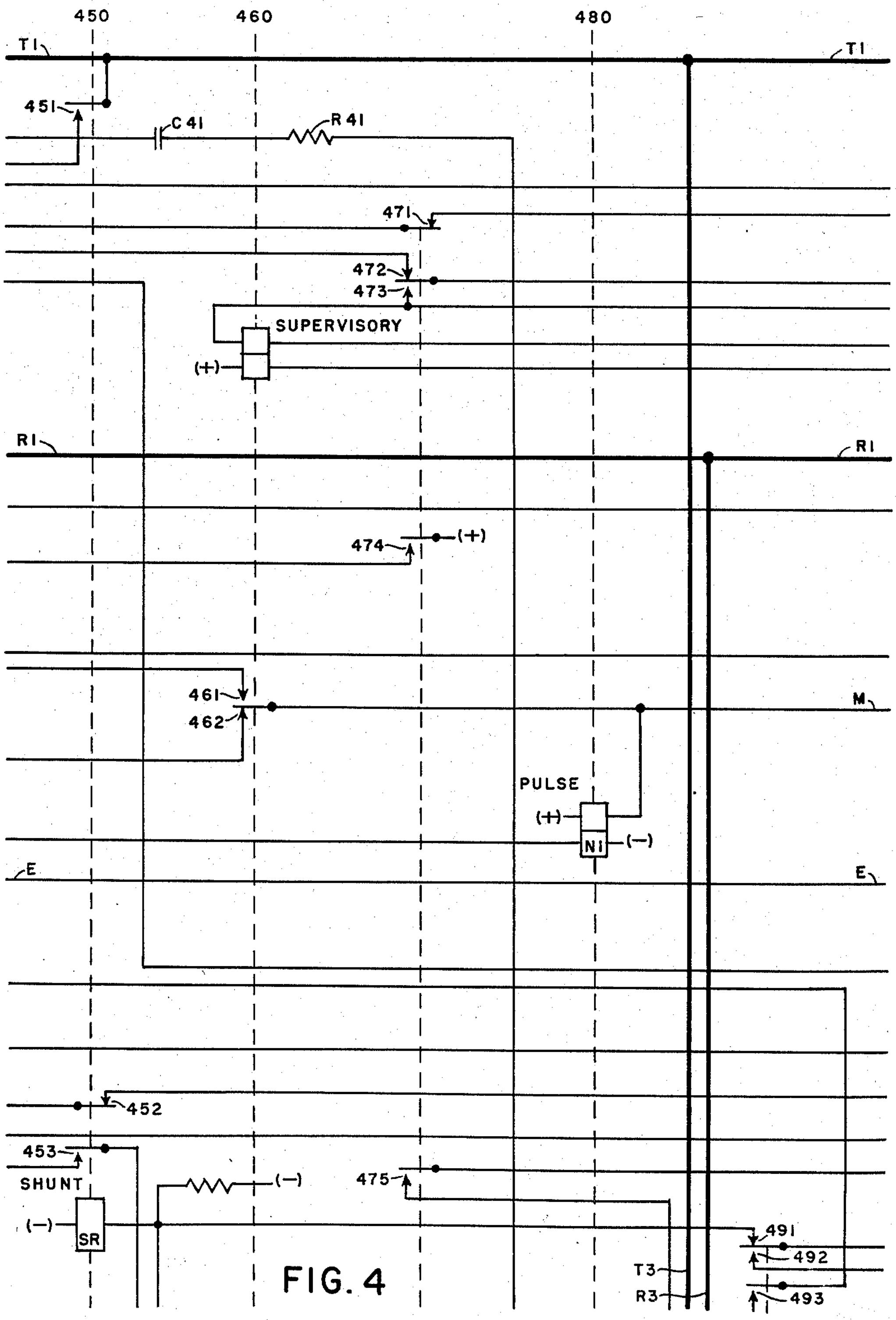

The call to be described is one which is incoming to trunk circuit 17 from toll or free service point of access **17*b***, upper lefthand corner of Fig. 2. It is reached by dialing any desired digit except zero. This call is incoming over conductors T1, R1, S1 and HS1.

*Seizure.*—A loop across conductors T1 and R1 is completed on seizure by any suitable equipment which is not shown. Responsive thereto, calling bridge relay 320 operates. The circuit for operating this relay extends from (—) battery through the lower winding of calling bridge relay 320, rest contacts 472, the lower lefthand winding of repeat coil RC51, rest contacts 247, conductor R1, through a loop (not shown) completed in the preceding equipment, conductor T1, rest contacts 241, the upper lefthand winding of repeat coil RC51, rest contacts 471, the upper winding of calling bridge relay 320 and rest contacts 523 to ground (+). The purpose of calling bridge relay 320 is to receive and repeat digit pulses and to mark the trunk circuit when in a seized condition. Contacts 322 close and 323 open, thereby switching conductor M from ground (+) to resistance battery. The circuit for resistance battery extends from (—) battery, through the resistance of the filament of lamp L21, rest contacts 309, operated contacts 322, rest contacts 462, conductor M, the upper winding of signal relay 540, and impedance I51 to conductor R4. This is a seizure signal to the distant office.

Contacts 321 close to operate pulse relay 330 over an obvious circuit. Relay 330 is merely a slave of relay 320 and is used to lighten the contact load of that relay. Pulse relay 330 closes its contacts 331 to operate coin tone relay 230. The circuit extends from (—) battery, through the winding of relay 230, rest contacts 268, 312, operated contacts 331 and rest contacts 511 to ground (+).

Coin tone relay 230 operates. The purpose of relay 230 is to transmit a coin box tone to an operator later during the call if it originated in a paystation. It closes its contacts 231 and 233 thereby preparing a path for coin tone. This path is not completed at this time, however, since contacts 245 and 246 are open. Contacts 235 close to extend ground (+) from the righthand winding of tone coil TC21, through contacts 235, rest contacts 341 and conductor S1 to the preceding equipment. This ground holds the preceding equipment in an operated condition. An alternate circuit is completed at contacts 237 for applying (—) battery through the resistance of lamp L21, contacts 237, 266, operated contacts 322, rest contacts 462 and conductor M.

Release delay relay 310 is operated over the circuit which extends from (—) battery, through the winding of relay 310, operated contacts 238, 331 and rest contacts 511 to ground (+). Its function is to control the release of the trunk circuit. Contacts 312 open to release coin tone relay 230. This in turn opens contacts 238 which is part of the circuit over which relay 310 is operated; however, that relay does not release at this time because it has already closed its own locking path from (—) battery via the winding of relay 310, contacts 313, 331 and 511 to ground (+). Contacts 311 close the complete a circuit from ground extended through the righthand winding of the tone coil TC21 to sleeve conductor S1. Contacts 314 have no function at this time. They prepare for reoperation of relay 230. Contacts 621, on relay 310, close to prepare for the operation of shunt relay 450 during the receipt of digit pulses.

Contacts 622 close to operate release delay slave relay 740. It is used to assist relay 310 in its control of the release of the trunk circuit. Contacts 341 open thereby eliminating one circuit from the sleeve to ground (+) which had been extended through the righthand winding of tone coil TC21 when coin tone relay 230 first operated. This is because contacts 311 have already closed to extend an alternate holding ground (+) from contacts 234 to sleeve conductor S1. Contacts 342 open and 343 close to switch conductor E from connection with the winding of pulse relay 480 to connection with the winding of relay 250. Relay 480 is used only on incoming calls. Contacts 741 close to apply a ground potential for operating relay 660, the circuit including contacts 632. Contacts 742 connect ground (+) with the upper winding of relay 250. Relay 250 is constructed to operate to only its first step when energized over its upper winding. The circuit extends from (—) battery through the upper winding of relay 250, rest contacts 801, 655 and 742 to ground (+). When so operated, the "X" or preliminary contacts 256 and 657 are operated. This prepares for controlled stepping of the minor switch during which time relay 250 will act as a first digit pulse delay relay by marking the end of the first digit pulse train.

Pulse sending relay 660 operates via contacts 632 when contacts 741 close and locks at its contacts 661 to ground (+) on contacts 741. Contacts 261 open to break idle line termination which comprises capacitor C41 and resistor R41. Contacts 262 through 265 have no effect on this call since it was not extended from the impulse send point of access. Contacts 267 complete an alternate circuit from (—) battery through lamp L21 to conductor M. Contacts 269 close to prepare a circuit for operating coin tone relay 230 if a proper first digit is dialed.

The trunk circuit has been seized. A seizure signal has been transmitted over conductor M to the distant office. Everything is now ready for the transmission of digit pulses. Nothing further happens until they are received.

*Dialing.*—When the digit pulses are received, various relays in the trunk circuit operate to repeat the digit pulses to the distant office. The pulses which are transmitted to the trunk circuit are in the form of open loop pulses. That is, a bridge (not shown) is connected across conductors T1 and R1 by preceding equipment. When the digit pulses are transmitted, this bridge is broken a number of times. It might be recalled that calling bridge relay 320 is held operated in series with this bridge; therefore, calling bridge relay 320 restores responsive to each pulse.

Contacts 322 and 323 are operated responsive to each restoration of calling bridge relay 320, thereby repeating the digit pulses over conductor M to the distant office. That is, when a pulse is being repeated, conductor M is connected with ground (+) through contacts 462 and 323. During the inter-digit pulse time, conductor M is connected with resistance (—) battery over contacts 462, 322, 267 and the filament of lamp L21. Equipment (not shown) at the distant end of conductors T4 and R4 follows these repeated digit pulses to operate call completing apparatus in that exchange. Differential signal relay 540 is arranged so that it will not respond to digit pulses transmitted from the local trunk circuit over conductors T4 and R4. Contacts 321 also follow the digit pulses to cause relay 330 alternately to restore and operate.

Pulse relay 330 is a slave of relay 320. It serves merely to lighten the contact load on calling bridge relay 320 so that it may respond to digit pulses with greater fidelity. Each time that pulse relay 330 restores responsive to the receipt of an incoming digit pulse, contacts 331 open and 332 close. This removes ground (+) from the circuit through the winding of release delay relay 310; however, it does not restore due to its slow release characteristics. Hence the preceding switch train continues to be held from ground (+) supplied through contacts 311. Contacts 332 close responsive to the first digit pulse to be received to operate shunt relay 450. The circuit for operating this relay extends from (—) battery, through the winding of relay 450, contacts 621, 332 and 511 to ground (+).

Shunt relay 450 operates to improve the pulsing characteristics by short circuiting the lefthand windings of repeat coil RC51. This circuit may be traced from conductor T1, through operated contacts 451, 244, 521, the upper lefthand winding of repeat coil RC51 and back to conductor T1. This short circuit eliminates the inductive effect of the repeat coil winding thereby improving the pulsing characteristics over conductor R4 to the distant office. Contacts 453 close to complete a locking circuit for supervision relay 250. This circuit extends from (—) battery, through the upper winding of relay 250, its "X" or preliminary contacts 256, operated contacts 453, 655 and 742 to ground (+). It might be recalled that relay 250 originally operated when release delay slave relay 740 operated. At that time the energizing circuit was through off-normal contacts 801 of the minor switch. Now, the locking circuit excludes the off-normal contacts; hence, supervision relay 250 is held operated to its first step independently of the minor switch off-normal contacts. Relay 250 acts as a pulse delay relay at this time since it is used to mark the end of the first digit pulse train.

Returning to the operation of pulse relay 330 as it follows digit pulses, contacts 731 open and close to repeat each digit pulse. A circuit may be traced from ground (+), through pulsing contacts 731, resting contacts 658, operated "X" or preliminary contacts 657 (both on relay 250) and through the winding of minor switch stepping magnet MS to (—) battery. Each time that a digit pulse is received by calling bridge relay 320, a pulse is transmitted through the winding of minor switch stepping magnet MS. This causes the brushes of the minor switch to be driven into the bank of contacts one step for each digit pulse that is received. Responsive to the first step, contacts 801 open and 802 close thus preparing for release of the switch and placing the continued first step operation of relay 250 solely under the control of shunt relay 450 at contacts 453.

At the end of the first train of digit pulses, pulse relay 330 is held in an operated condition. Shunt relay 450 releases after the expiration of its slow release time interval. That is, pulse relay 330 has been opening and closing contacts 332 over which shunt relay 450 was held operated. However, the inter-digit pulse time is such that relay 450 will not release during this time due to its slow release characteristics. But, at the end of the digit pulse train, contacts 332 remain open long enough for relay 450 to restore. This opens contacts 451 to return the inductive effect of repeat coil RC51 to its normal relation in the talking circuit. Contacts 453 open to restore supervision relay 250, thus marking the end of the first digit pulse train. It might be recalled that its locking circuit extended from (—) battery, through the upper winding of relay 250, operated "X" or preliminary contacts 256, operated contacts 453, rest contacts 655 and operated contacts 742 to ground (+). Supervision relay 250 drops back to open its contacts 657 thereby disconnecting the stepping magnet for the minor switch from pulsing contacts 731. In this manner, it may not respond to any digit pulse train transmitted through the trunk circuit other than the first digit pulse train. This is because contacts 801 are now open so that supervision relay 250 may not be reoperated at this time.

Figure 1:
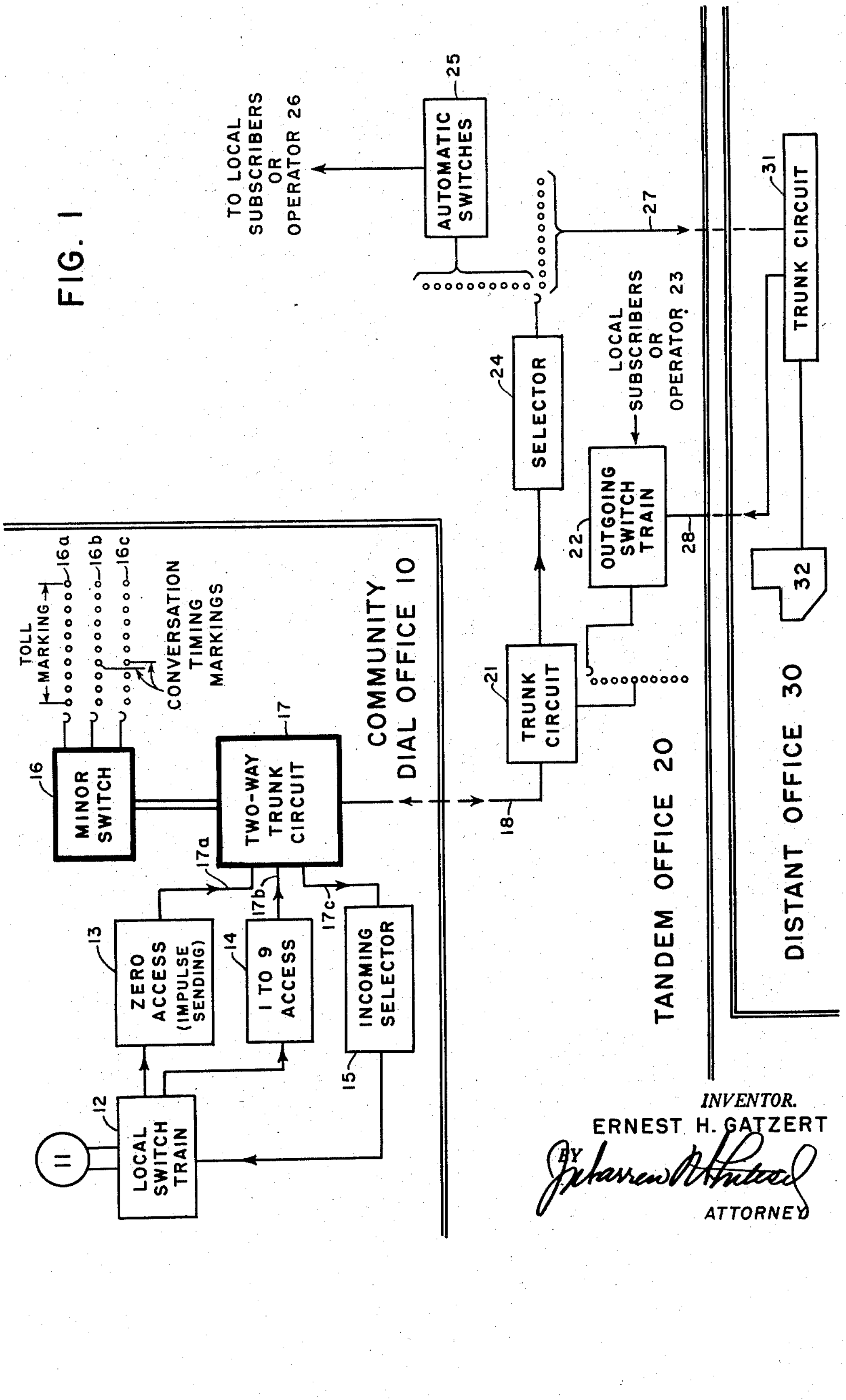

*Toll marking.*—The circuit function which follows at this time depends upon the position to which the minor switch was driven by the first digit. If the first digit was either "1" or "0," a circuit is completed through top bank 16*a* of the minor switch (Fig. 5) to operate toll relay 300. This is because either the distant office is to be operated on a tandem basis for extending the call to a still more distant office, or because the call is extended to an operator in the distant office. For example, referring to Fig. 1, the call could be extended from community dial office 10 to either an operator at position 32 or to operator 26. In the first case, office 20 is said to be used as a tandem office. In either case, it is necessary to extend coin box tone, if present, over conductors T4 and R4 and to eliminate conversation timing and reverse battery supervision normally extended over conductors T1 and R1.

In greater detail, toll relay 300 is operated over a circuit which may be traced from (—) battery, through the upper winding of relay 300, the strappings on either the first or zero position of the top bank of the minor switch (Fig. 5) depending upon the position to which the minor switch was driven by the first digit, rest contacts 452, 255, 301*a*, operated contacts 311 and the righthand winding of tone coil TC21 to ground (+) in parallel with the ground (+) applied at contacts 234. Contacts 301, 302, 306 and 307 are operated but have no effect at this time. As will be explained presently, when relay 240 operates its contacts 241, 242, 247 and 248, the normally applied reverse battery answer supervision will not be extended because of this operation of contacts 301, 302, 306 and 307; hence, toll relay 300 has killed reverse battery supervision. Contacts 304 are not effective on this call. They relate to calls through impulse sending point of access 17*a*. Contacts 305 and 309 are "X" or preliminary contacts which are the first to operate. This is so that toll relay 300 will be locked in its operated condition before contacts 301*a* open to break the circuit over which this relay was energized originally. The locking circuit extends over the path from (—) battery, through the upper winding of relay 300, contacts 305, 311 and the righthand winding of tone coil TC21 to ground (+) in parallel with the ground (+) applied at contacts 234. Contacts 308 have no influence at this time. Contacts 301*a* open to break the path over which relay 300 operated before it locked. Contacts 601 operate to break a possible path used for stepping magnet MS during conversation timing.

When toll relay 300 operates, it closes contacts 302*a* thereby operating coin tone relay 230 over a circuit which may be traced from (—) battery, through the winding of relay 230, operated contacts 269, 314, rest contacts 243*a* and operated contacts 302*a* to ground (+). Coin tone relay 230 operates to close contacts 231 and 233 thereby preparing to extend coin tone to the operator. Contacts 234 open to switch the ground (+) marking applied to sleeve conductor S1 from direct ground to ground extended through the righthand winding of tone coil TC21, contacts 311 and sleeve S1. Contacts 236–238 have no function at this time. Contacts 631 close to apply an alternate ground (+) to the locking circuit for relay 660. Contacts 633 close to start the common interrupter equipment which furnishes various currents, signals and pulses.

The person who originated the call may now transmit any suitable number of digit pulse trains to cause subsequent equipment such as elements 24 and 25 (Fig. 1), for example, to seize and signal the operator at the destination of the call. Of course, a subscriber would be signaled at this time if he had been called.

*Answer supervision not sent.*—Responsive to answer at the called station, the potential on conductor R4 is changed so that signal relay 540 operates. It closes its contacts 541 thereby extending a marking over conductor E, operated contacts 343, rest contacts 253 and the lower winding of relay 250 to (—) battery. Supervision relay 250 is arranged so that is is operated to its second step when energized over its lower winding. At this time, all contacts of relay 250 are operated. Contacts 252 close to lock supervision relay 250 to sleeve conductor S1 independently of the potential which might be applied to or removed from conductor E. Contacts 251 close to initiate the heating of thermistor TH21. The purpose of thermistor TH21 is to delay operation of relay 240 until the minor switch is back to normal so as not to cut timing short on calls to a subscriber. Release of this switch is explained below. Contacts 254 have no function at this time. Contacts 255 open another point in the circuit over which toll relay 300 was originally operated. Contacts 256 have no function at this time since shunt relay 450 is now deenergized and contacts 453 are open. Contacts 257 have no function at this time since contacts 303*a* are now open. Contacts 651 close. If this call were to a subscriber, these contacts would initiate conversation timing by connecting timing pulse #1 conductor to the winding of timing relay #1 790; however, there is no conversation timing on calls involving either one or zero as the first digit, which is assumed in the case of this call.

Ground is extended to release the minor switch when relay 250 operates. This circuit may be traced from (−) battery, through the winding of release magnet MR, operated off-normal contacts 802, rest contacts 837, operated contacts 654 and 742 to ground (+). Contacts 658 are operated to break the path to ground (+) which was used to step magnet MS during receipt of the first digit pulse train. Contacts 656 close; however, they have no function since contacts 601 are held open by locked relay 300.

After a brief interval occasioned by the heating of thermistor TH21, supervision slave relay 240 operates. Contacts 241 and 247 open while contacts 242 and 248 close. If toll relay 300 had not already operated, this would transmit reverse battery answer supervision over conductors T1 and R1. However, since the toll relay has operated, these contacts have no effect. Answer supervision is not desirable at this time because, as the initial digit "one" or "zero" has indicated, the call has been extended to an operator position. Otherwise, a paystation would have its coin collected or a restricted service telephone station would have its call meter energized on a free service call. Contacts 243 have no function at this time.

*Coin tone sent.*—Contacts 245 and 246 close to transmit coin tone to the operator, if required, so that she may know what type of supervision to give. In greater detail, if there is to be coin tone it will be applied to sleeve conductor S1 by equipment, not shown, but located at the paystation line circuit. This tone will be extended from sleeve S1 through operated contacts 311 and the righthand winding of tone coil TC21 to ground (+). This tone will be induced into the lefthand winding of the coil and connected through contacts 245 and 246 (in parallel) and 231 and 233 (also in parallel) to the tip and ring conductors, T1 and R1 respectively. This tone may be heard by the operator at the called switchboard. Contacts 249 and 241*a* cooperate to switch conductor HS1 from its normal resistance ground marking applied through resistor R21 to resistance battery marking applied through resistor R57. This signal may be used by any equipment in the preceding circuit, as required. Contacts 242*a* close to shunt thermistor TH21, thereby reducing the wear on it. Contacts 243*a* open to break the energizing circuit to coin tone relay 230. This circuit included contacts 269, 314, 243*a* and 302*a*. However, relay 230 does not release immediately. A charge has been built upon capacitor C21 during the time that the energizing circuit was completed. This capacitor begins to discharge when contacts 243*a* open, and for a brief interval of time coin tone relay 230 is held operated by the discharge current. After the expiration of this brief interval of time, the coin tone relay releases to open its contacts 231 and 233 thereby removing the coin tone from the talking conductors. In this manner, the operator is informed of the fact that the call originates at a paystation.

Returning to the operation of relay 240, contacts 244*a* close to provide an alternate ground for holding release delay relay 310 in an operated condition. Contacts 641 close to operate relay 530. The circuit also includes contacts 833 and the lower winding of the relay.

*No conversation timing.*—Contacts 642 and 643 have to do with conversation timing. However, it has been assumed that the call was one in which the first digit was either "one" or "zero" so that toll relay 300 was operated and is now locked. This indicates that the call is going to an operator's position; therefore, there is no need for conversation timing. For this purpose, contacts 601 are held open. As will be explained presently, on conversation timing it is necessary to have contacts 601 closed to operate the minor switch step-by-step to time the call.

To review briefly, it is seen that toll relay 300 is effective at its contacts 302 and 306 to eliminate reverse battery answer supervision. It is effective at its contacts 302*a* to provide coil box tone. It is effective at its contacts 601 to eliminate conversation timing.

*No toll marking*

Next, it is assumed that the calling operator or subscriber dialed some digit other than "1" or "0" as the first digit in the call, thus indicating that the call is going to a subscriber and not to an operator. In this case, toll relay 300 will not be operated, coin box tone will be eliminated, conversation timing and reverse battery supervision will be provided.

Figure 5:
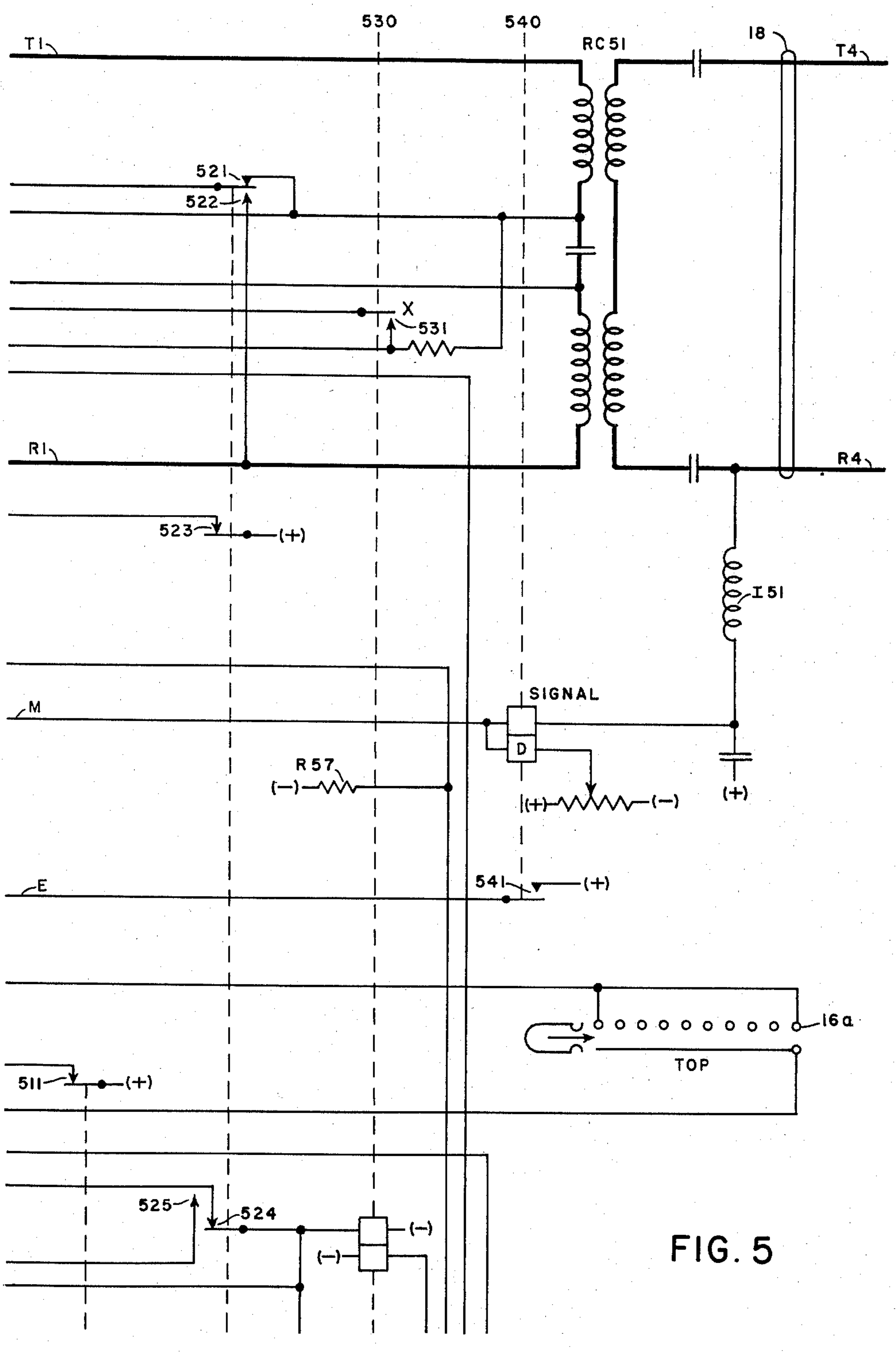
Figure 6:
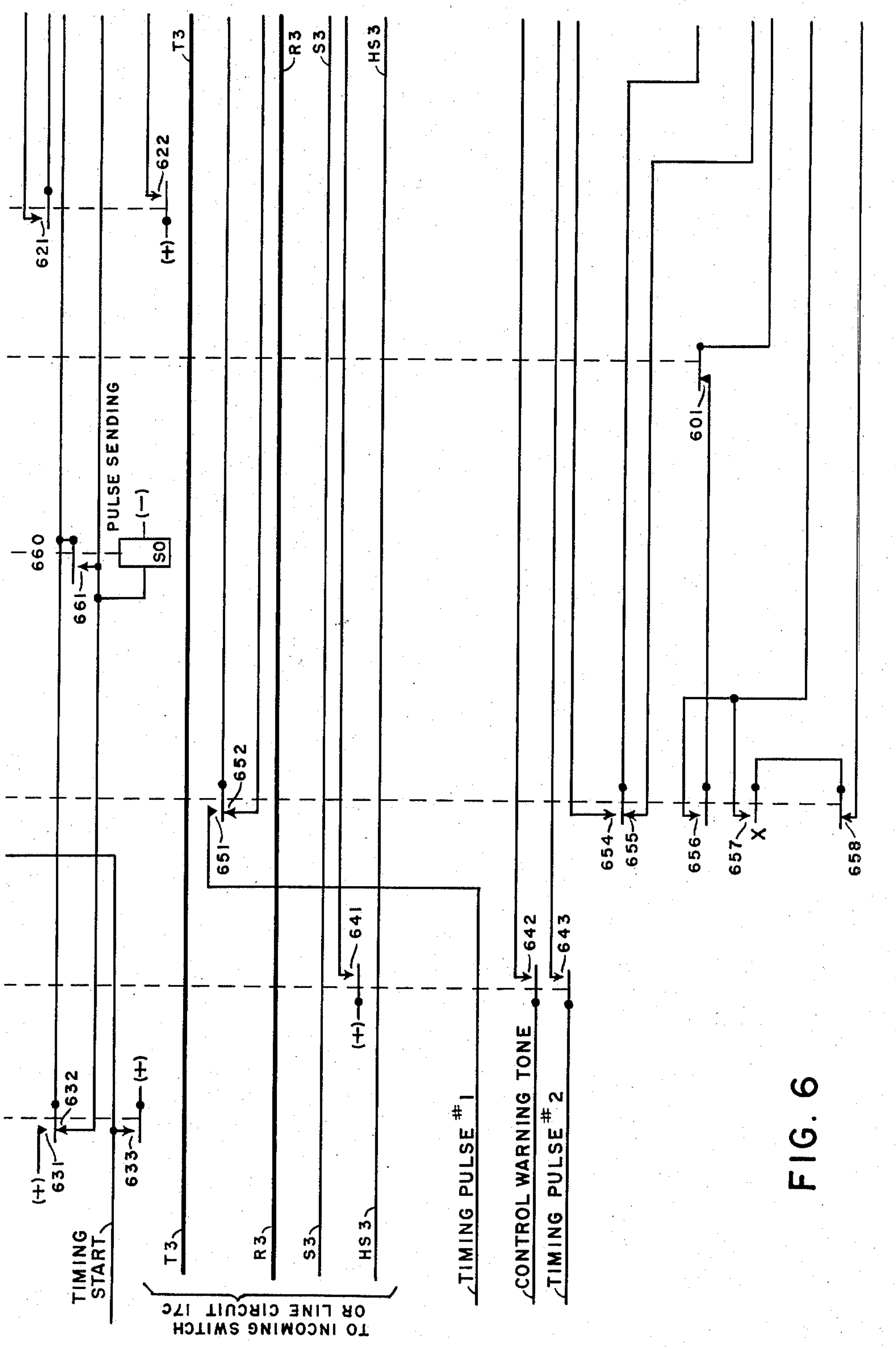
Figure 7:
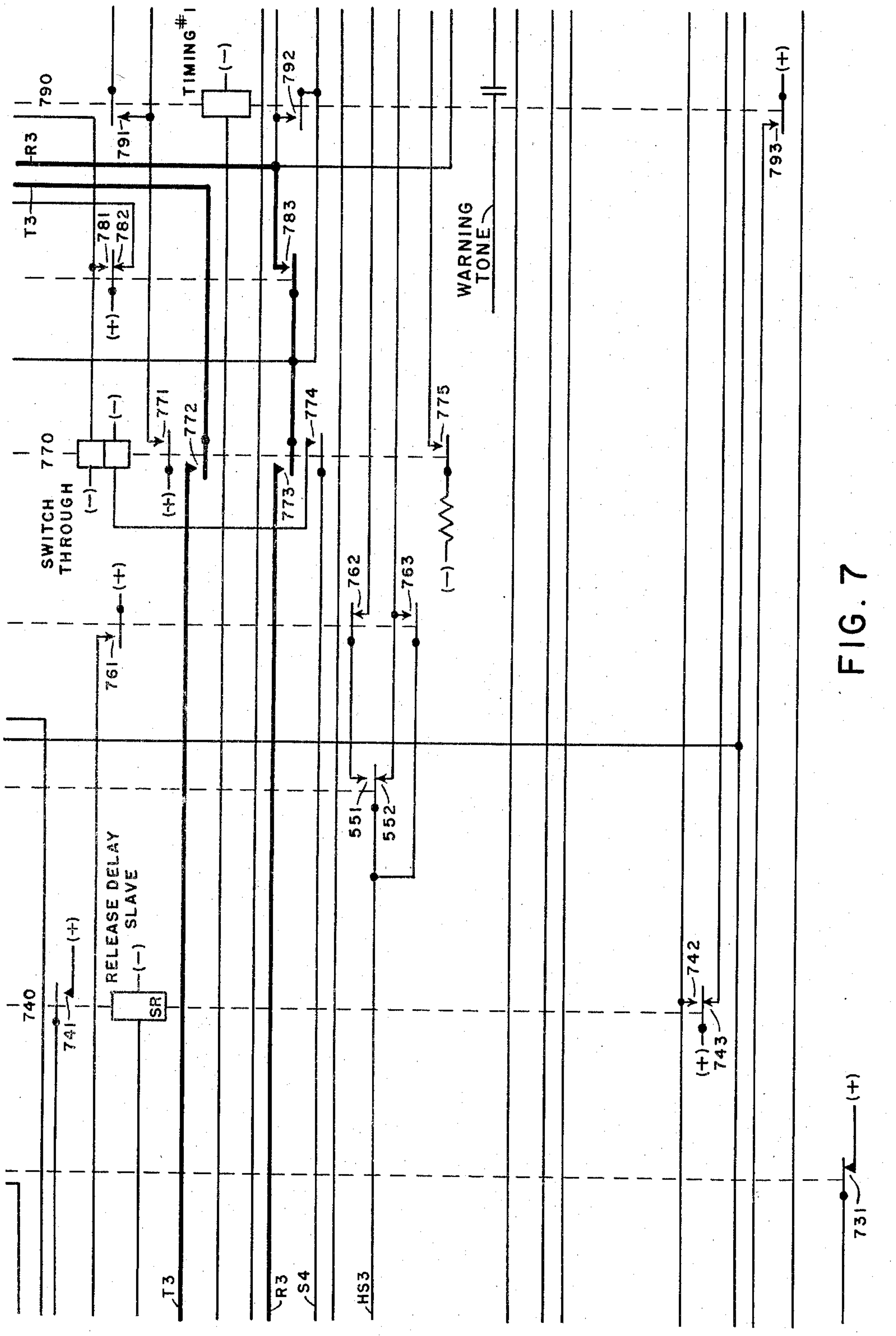
Figures 8, 9:
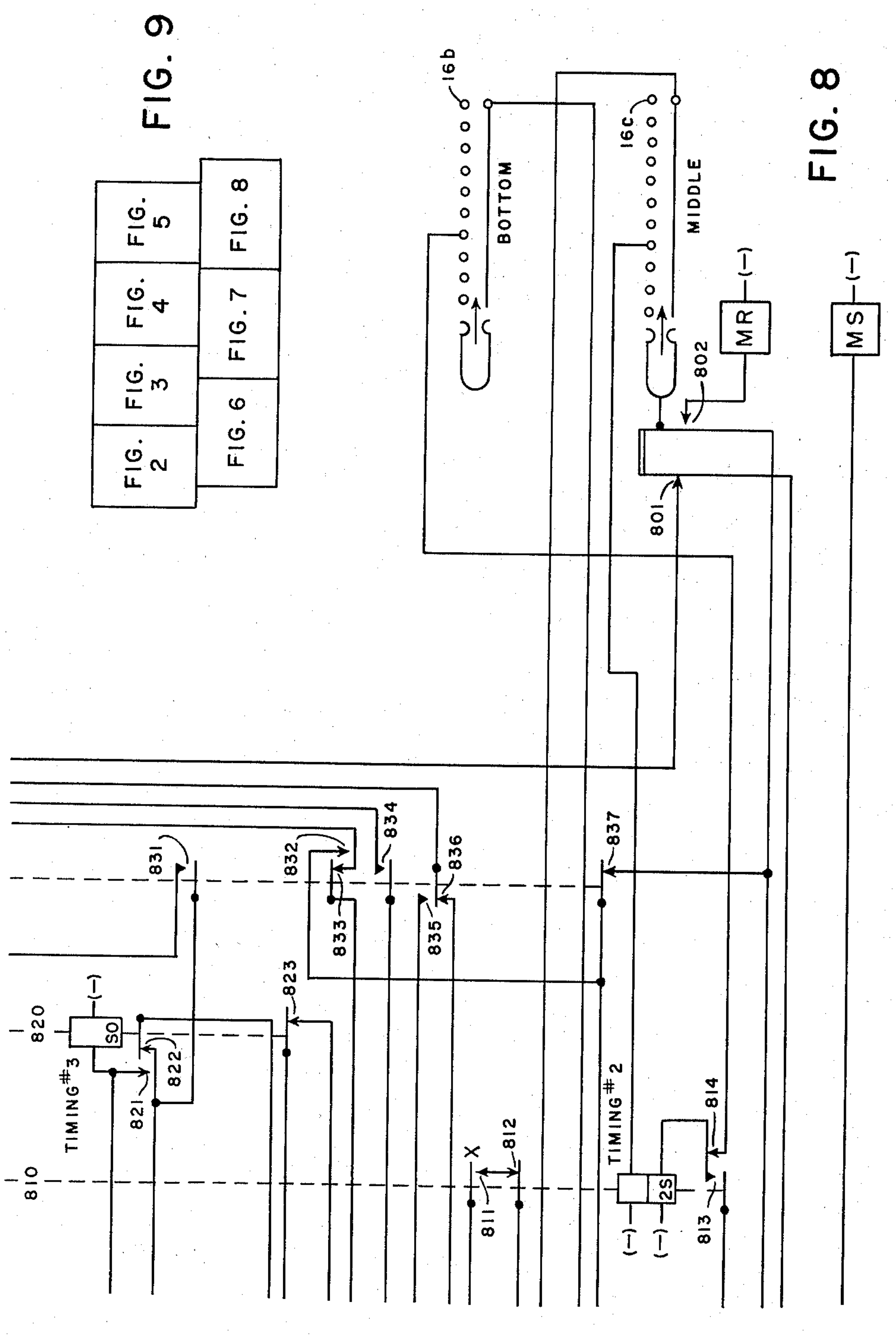

*Answer supervision.*—In greater detail, assuming that the first digit to be dialed into the trunk circuit was something other than the numbers "one" or "zero" the minor switch is directed to a step having no strap connected thereto on top bank 16*a* (Fig. 5). Thus, there is no circuit for operating toll relay 300. It might be well to recall that the circuit for operating relay 300 during the previously described call extended from (−) battery, through the upper winding of relay 300, terminals "one" or "zero" in the upper bank of the minor switch, contacts 452, 255, 301*a*, 311 and 234 to ground (+). Toll relay 300 does not operate; therefore, when supervision slave relay 240 operates responsive to answer supervision, a circuit is completed through contacts 242, 301, the lower lefthand winding of repeat coil RC51, contacts 472, and the lower winding of calling bridge relay 320 to (−) battery. A circuit is also completed from ring conductor R1, through operated contacts 248, rest contacts 307, conductor T1, the upper lefthand winding of repeat coil RC51, contacts 471, the upper winding of calling bridge relay 320, and contacts 523 to ground (+). Hence, it is seen that the direction of battery flow over conductors T1 and R1 has been reversed to give answer supervision.

*No coin tone sent.*—Since toll relay 300 is not now operated, contacts 302*a* are open. This means that coin tone relay 230 is not operated at this time. It might be recalled that the second operation of this relay during a call was occasioned by the completion of the circuit from (−) battery, through the winding of relay 230, contacts 269, 314, 243*a* and 302*a*, now open, to ground (+). Since coin tone relay 230 does not operate, contacts 231 and 233 are opened; hence, coin box tone is not extended over the talking conductors.

*Conversation timing.*—It has been assumed that on this call the first digit through the trunk circuit did not register the numbers "one" or "zero" on the minor switch so that toll relay 300 has not been operated; hence, contacts 601 are closed. Conversation timing is initiated when answer supervision from the distant office operates supervision relay 250. It in turn closes its contacts 651, thereby completing a circuit from timing pulse #1 conductor through the winding of timing relay 790 to (−) battery. In due course, a pulse appears on this conductor applied under the influence of a common interrupter. Relay 790 operates and contacts 793 close. A circuit is now completed from ground (+), through contacts 793, rest contacts 601, operated contacts 656 and the winding of minor switch stepping magnet MS. This causes the minor switch to take one step into its banks. The top bank has a strapping on this terminal; however, it is ineffective since contacts 255 are now open. The next timing pulse comes in over timing pulse #1 conductor two minutes later and operates timing relay 790 a second time. This, in turn, completes the circuit through contacts 793, 601, 656 and the winding of magnet MS to step the minor switch a second time.

The third and fourth pulses on timing pulse #1 conductor also drive the minor switch one step each. When the minor switch is stepped to its fourth terminal, a circuit is completed from the control warning tone conductor, through contacts 642, the fourth step of the minor switch and the upper winding of timing relay 810 to (−) battery. Relay 810 is pulled to its first step only when energized over this circuit. On this step, only the "X" or preliminary contacts are operated. A circuit is now completed from the warning tone conductor, through contacts 812, 811, conductor R3, the lower lefthand winding of repeat coil RC51, contacts 472 and the lower winding of calling bridge relay 320 to (−) battery. The signal current superimposed upon this conductor creates a tone which is sufficient to inform the talking subscribers of the fact that their call is about to be disconnected. After a while, the control warning tone pulse is removed and relay 810 is restored thus removing warning tone.

After another brief interval of time, a pulse appears on timing pulse #2 conductor. This pulse is transmitted through contacts 643, bank 16*b* of the minor switch, a strapping on the terminal to which the minor switch was directed, contacts 814 and the lower winding of relay 810. Relay 810 is adapted to operate to its second step when energized over this circuit including its lower winding. On this step, all contacts controlled by this relay are operated. Relay 810 locks to ground over a circuit which may be traced from (−) battery, through its lower winding, contacts 813 and 742 to ground (+). Contacts 812 open to prevent the transmission of warning tone at this time. Contacts 511 open to remove master ground (+). Release delay relay 310 had been locked in an operated condition over a circuit which may be traced from (−) battery, through the winding of relay 310, operated contacts 313, 331 and 511 to master ground (+), now removed. This relay restores and opens contacts 311 to remove the ground (+) marking from sleeve conductor S1. Responsive thereto, the preceding equipment releases. When it does so, the circuit to calling bridge relay 320 is opened. It releases. Contacts 323 close to transmit a disconnect signal to the distant office by grounding conductor M. The trunk circuit is now returned to normal and nothing further happens until the next call is placed.

To review briefly, it is seen that when toll relay 300 is not operated, contacts 301 and 307 remain closed so that reverse battery supervision is extended to the calling station on answer. Contacts 302*a* remain open so that coin tone is not transmitted. Contacts 601 remain closed so that conversation timing may be effective.

Only one embodiment of the invention has been shown and described; however, it should be understood that the attached claims are intended to cover not only this specific embodiment but also all modifications which may fall within the true spirit of the invention.

What is claimed is:

1. In an automatic telephone system, a trunk circuit including talking conductors, means for completing calls of at least two classes through said trunk circuit, means for transmitting digit pulses over said talking conductors through said trunk circuit, means for registering the numerical value of the first digit transmitted through said trunk circuit, means for selectively marking said registering means to indicate said class of calls, means responsive jointly to said marking and to the registration of said digit for providing either coin box tone on a first of said classes of calls or conversation timing and reverse battery answer supervision on another of said classes of calls, means for releasing said register means, and means responsive to answer supervision during said other class of calls for reoperating said register means for conversation timing.

2. The automatic telephone system of claim 1 and means for producing a plurality of time-spaced cyclically recurring pulses for controlling said register means during said reoperation, control marking means connected to said register means, means responsive jointly to said reoperation of said register means and to said control marking means for transmitting a warning tone at the end of a first timed period, and means for releasing said call at the end of a later timed period.

3. The automatic telephone system of claim 2 and a two-step relay, said means for transmitting said warning tone comprising said relay operated to a first of its said two steps, and said means for disconnecting said call comprising said relay operated to the other of said two steps.

4. The automatic telephone system of claim 1 and a two-step relay, means for operating said relay to one of its two steps responsive to the extension of a call to said two-way trunk circuit, means for holding said relay on said one step throughout a pulse train representing said first digit, said registering means comprising a minor switch, means responsive to operation of said relay to said one step for completing a stepping circuit to said minor switch, said means for registering said first digit comprising means responsive to each digit pulse in said first pulse train and effective over said stepping circuit for stepping said minor switch, means responsive to the end of said first digit pulse train for breaking said holding means to release said relay from said one step, means for returning answer supervision to said trunk circuit upon the completion of said call, means responsive to said answer supervision for operating said relay to the other of its said two steps for completing supervision functions.

5. The automatic telephone system of claim 4 and inductive reactance means connected to said talking conductors, a slow release relay, and means controlled by said slow release relay for removing said inductive reactance from said talking conductors, said means for holding said two-step relay comprising contacts controlled by said slow release relay.

6. The automatic telephone system of claim 5 and a relay connected to respond to and repeat digit pulses transmitted to said trunk circuit, and means responsive to said last named relay for energizing said slow release relay responsive to the receipt of each digit pulse, said slow release relay having characteristics such that it does not release throughout a digit pulse train when so energized responsive to digit pulses.

7. The automatic telephone system of claim 4 and means for producing a plurality of time-spaced cyclically recurring pulses for controlling said minor switch during said reoperation, control marking means connected to said minor switch, means responsive jointly to said reoperation of said minor switch and to said control marking means for transmitting a warning tone at the end of a first timed period, and means for releasing said call at the end of a later timed period.

8. The automatic telephone system of claim 7 and another two-step relay connected to be operated by said control marking means, said means for transmitting said warning tone comprising said another relay operated to a first of its said two steps, and said means for disconnecting said call comprising said another relay operated to the other of said two steps.

9. A conversation timing circuit for use in an automatic telephone system comprising; a first two-step means, register means, means responsive to operation of said first two-step means to one of its said steps for controlling said register means to register the numerical value of a digit pulse train, means for releasing said register means after registration of said digit pulse train, means for providing cyclically recurring timed pulses, means responsive to operation of said first two-step means to the other of its said two steps for connecting said timed pulses provided by said last named means to reoperate said register means to measure the expiration of a fixed timed period, a second two-step means, means responsive to the expiration of said timed period as measured by said register means during said reoperation for operating said second two-step means to one of its said two steps, means responsive to said last-named operation for transmitting a warning tone to conversing subscribers, means responsive to the expiration of another timed period for operating said second two-step means to the other of its said two steps, and means responsive to said last-mentioned operation for releasing said call.

10. In an automatic telephone system; means for transmitting digit pulse trains, a two-step means, a register means, means for operating said two step means to one of its two steps responsive to the extension of a call thereto, means for holding said two step means on said one step throughout receipt of a digit pulse train, means responsive to operation of said two-step means to said one step for completing a circuit to said register means, means for registering said digit pulse train comprising means responsive to each digit pulse in said pulse train and effective over said circuit for said register means, means responsive to the end of said digit pulse train for causing said holding means to release said two-step means from said one step, means for returning answer supervision upon the completion of said call, and means responsive to said answer supervision for operating said two-step means to the other of its said two steps for completing supervision functions.

11. The automatic telephone system of claim 10 and a pair of talking conductors, inductive reactance means connected to said talking conductors, a slow release relay, means for energizing said slow release relay responsive to each of said digit pulses, whereby said slow release relay operates at the beginning, holds throughout and releases at the end of said digit pulse train, and means controlled by said slow release relay for removing said inductive reactance from said talking conductors throughout said digit pulse train, said means for holding said two step means comprising contacts controlled by said slow release relay.

12. The automatic telephone system of claim 11 and means for reoperating said register means for conversation timing comprising means for producing a plurality of time-spaced cyclically recurring pulses for controlling said register means during said reoperation, control marking means connected to said register means, means responsive jointly to said reoperation of said register means and to said control marking means for transmitting a warning tone at the end of a first timed period, and means for disconnecting said call at the end of a later timed period.

13. The automatic telephone system of claim 12 and another two-step means, said means for transmitting said warning tone comprising said another two-step means operated to a first of its said two steps, and said means for disconnecting said call comprising said another two-step means operated to the other of said two steps.

14. In an automatic telephone system, a two-step relay, means for operating said two-step relay to one of its said steps, means for holding said relay operated on said one step, means for transmitting a plurality of digit pulse trains, a slow release relay including a winding, means for repeating said digit pulses through said winding, whereby said slow release relay is held in an operated condition throughout said digit pulse train due to its slow release characteristics and released automatically thereafter, means for transferring said holding means to the control of said slow release relay to provide a first circuit function under control of said two-step relay whereby said two-step relay is restored at the end of the pulse train, and means for operating said two-step relay to the other of its said steps to provide a second circuit function.

15. The automatic telephone system of claim 14 wherein said system comprises a pair of talking conductors, inductive reactance means connected thereto, and means responsive to operation of said slow release relay for effectively removing said inductive reactance from said talking conductors.

16. The automatic telephone system of claim 14 and a minor switch having off-normal contacts, said means for operating said two-step relay to said one step comprising circuit means including said off-normal contacts, and circuit means including contacts on said two-step relay for stepping said minor switch to register said first digit, whereby said first circuit function is accomplished.

17. The automatic telephone system of claim 16 and means for thereafter releasing said minor switch, means for returning answer supervision, said means for operating said two-step relay to the other of its said steps being responsive to said answer supervision, and means responsive to said last named operation of said two-step relay for initiating conversation timing.

18. The automatic telephone system of claim 16 wherein said system comprises a pair of talking conductors, inductive reactance means connected thereto, and means responsive to operation of said slow release relay for effectively removing said inductive reactance from said talking conductors.

References Cited in the file of this patent

UNITED STATES PATENTS

| | | |
|---|---|---|
| 2,652,455 | Lomax | Sept. 15, 1953 |
| 2,702,314 | Pharis | Feb. 15, 1955 |